United States Patent
Israel et al.

(10) Patent No.: US 11,030,303 B2
(45) Date of Patent: Jun. 8, 2021

(54) TIME LIMITED APPLICATION ENABLEMENT

(71) Applicant: Microsoft Technology Licensing, LLC, Redmond, WA (US)

(72) Inventors: Moshe Israel, Ramat Gan (IL); Ben Kliger, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 102 days.

(21) Appl. No.: 15/626,892

(22) Filed: Jun. 19, 2017

(65) Prior Publication Data

US 2018/0365412 A1 Dec. 20, 2018

(51) Int. Cl.

| | |
|---|---|
| *G06F 21/52* | (2013.01) |
| *H04L 29/08* | (2006.01) |
| *G06F 21/51* | (2013.01) |
| *G06F 21/10* | (2013.01) |
| *G06F 21/62* | (2013.01) |
| *G06F 21/53* | (2013.01) |

(52) U.S. Cl.
CPC .............. *G06F 21/52* (2013.01); *G06F 21/10* (2013.01); *G06F 21/51* (2013.01); *G06F 21/53* (2013.01); *G06F 21/629* (2013.01); *H04L 67/02* (2013.01); *H04L 67/10* (2013.01); *H04L 67/325* (2013.01); *G06F 2221/033* (2013.01)

(58) Field of Classification Search
CPC . G06F 21/52; G06F 2221/033; H04L 67/325; H04L 67/10
See application file for complete search history.

(56) References Cited

U.S. PATENT DOCUMENTS

| | | | |
|---|---|---|---|
| 7,975,034 B1 * | 7/2011 | Chandra | G06F 21/575 709/220 |
| 8,069,487 B2 | 11/2011 | Fanton et al. | |
| 9,152,694 B1 | 10/2015 | Padidar et al. | |
| 9,165,160 B1 | 10/2015 | Tidd | |
| 9,197,656 B2 | 11/2015 | Butler et al. | |
| 9,374,379 B1 * | 6/2016 | Hew | H04L 63/108 |

(Continued)

OTHER PUBLICATIONS

Rouse, Margaret., "application whitelisting", http://searchsecurity.techtarget.com/definition/application-whitelisting, Retrieved on: Apr. 25, 2017, 4 pages.

*Primary Examiner* — Oschta I Montoya
(74) *Attorney, Agent, or Firm* — Fiala & Weaver P.L.L.C.

(57) ABSTRACT

Methods, systems, and apparatuses are provided for managing an execution of applications in a computing environment. A whitelist list of applications that are permitted to execute in a computing environment is obtained. For one or more of the applications on the whitelist, a temporal rule is assigned that specifies a time period in which the application is permitted to execute in the computing environment. For instance, the temporal rule may be obtained via a user input or may be determined automatically by analyzing an execution history of the application. Applications are permitted to execute in the computing environment during the time period specified by the temporal rule, and are prevented from executing outside of the time period. By restricting the time period in which an application can execute, the overall vulnerability to malware attacks in a computing environment may be reduced.

20 Claims, 8 Drawing Sheets

(56) References Cited

U.S. PATENT DOCUMENTS

| | | | |
|---|---|---|---|
| 9,465,955 B1 | 10/2016 | Tidd | |
| 2012/0042036 A1* | 2/2012 | Lau | G06F 8/61 |
| | | | 709/217 |
| 2012/0110174 A1 | 5/2012 | Wootton et al. | |
| 2014/0090077 A1 | 3/2014 | Jeong et al. | |
| 2014/0331314 A1* | 11/2014 | Fujioka | G06F 21/6218 |
| | | | 726/17 |
| 2017/0329475 A1* | 11/2017 | Park | G06F 3/0482 |
| 2018/0316778 A1* | 11/2018 | Tucker | G06F 9/50 |

* cited by examiner

600

602

Assigning a rule, through a user interface, that specifies one or more time period(s) during which a permitted application can execute

Modifying a start time, end time, run time, and/or a recurrence of a rule

Obtaining a permitted application's execution history

804

Automatically determining a rule that specifies one or more time period(s) during which the permitted application can execute

806

Adjusting, through a user interface, an automatically determined rule

TIME LIMITED APPLICATION ENABLEMENT

BACKGROUND

Malware is a type of malicious or otherwise unauthorized software installed and executed on a device as part of an attack. Without any safeguards, malware can spread from one device to another relatively easily through various electronic means, for example through email attachments or by being embedded in an otherwise seemingly innocuous program or service. With a heavy reliance on computing systems across virtually every industry, the risk of a company's systems being the subject of a malware attack is increasingly important. As a result, the protection of both computers connected on large networks, as well as individual computing systems, has become critical. The high costs of malware attacks have required that companies and individuals spend vast resources in developing and purchasing security systems to defend against such attacks, including, for example, firewall systems, antivirus systems, authentication systems, intrusion prevention systems, access control systems, application blocking system, and so on.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for a managing the execution of applications on a computing device. A whitelist of applications that are permitted to execute on the computing device is obtained. The whitelist may be obtained, for example, via another computing device or may generated on the computing device itself. For one or more of the applications that are permitted to execute, a rule is assigned that specifies one or more time periods in which the application is permitted to execute on the device. For instance, the rule may be assigned automatically via an execution history or may be assigned through a user input. Applications present on the list of permitted applications may be executed during the specified time period, and may be prevented from executing at times outside of the specified time period.

In this manner, applications on a whitelist are prevented from executing on a computing device more often than necessary, thereby decreasing a system's overall vulnerability. Given that even applications deemed to be safe can be susceptible to being embedded with malicious code, reducing an allowable time period for the application to execute, for example from twenty-four hours a day to thirty minutes a day, drastically reduces the attack surface of the computing device.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 6 shows a flowchart of a method for specifying one or more time periods during which a permitted application may execute via a user interface, according to an example embodiment.

FIG. 7 shows a flowchart of a method for modifying a rule that specifies one or more time periods during which an application may execute, according to an example embodiment.

FIG. 8 shows a flowchart of a method for automatically determining a rule that specifies one or more time periods during which an application may execute on a computing device, according to an example embodiment.

Figure 1:
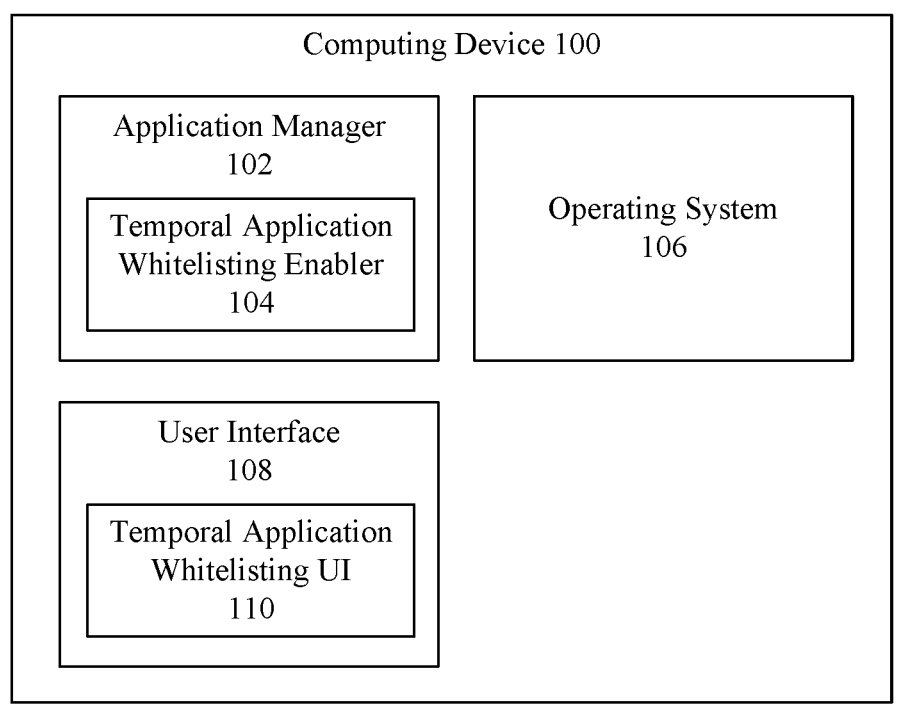
FIG. 1 shows a block diagram of a system for managing an execution of applications on a computing device, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example embodiments. The scope of the present application is not limited to the disclosed embodiments, but also encompasses combinations of the disclosed embodiments, as well as modifications to the disclosed embodiments. References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As noted in the Background section above, malicious or otherwise unauthorized software, also known generally as malware, may be installed and executed on a device as part of an attack. Without any safeguards, malware can transfer relatively easily from one device to another through various electronic means, such as through email attachments or by being embedded in an otherwise seemingly innocuous program or service. With the heavy reliance on computing systems across virtually every industry, the risk of a company's systems being the subject of a malware attack is increasingly important. As a result, the protection of both computers connected on large networks, as well as individual computing systems, has become critical. The high costs of malware attacks require that companies and individuals spend vast resources in developing and purchasing security systems to defend against such attacks, including, for example, firewall systems, antivirus systems, authentication systems, intrusion prevention systems, access control systems, application blocking system, and so on.

For instance, an application blocking system, e.g., an application blacklist, may reduce the possibility of a malware attack on a system by blocking all known malware from executing on a system. While application blocking systems may reduce the possibility of a malware attack on a system by blocking all known malware from executing, such an approach requires resources to continuously monitor the system as well as resources to constantly update the list of known malware. In an alternative system, an application whitelist may be implemented in which information technology (IT) personnel of a corporation may analyze and authorize only those applications that meet the strict security standards of the corporation. When an operating system executing on a computer receives a request to execute an application, the operating system determines whether the application is on the whitelist. If the application is not on the whitelist, the execution of the application may be blocked.

An organization may have thousands of servers and thousands of user computers (e.g., desktops and laptops) connected to their network. The servers may each be a certain type of server such as a load balancing server, a firewall server, a database server, an authentication server, a personnel management server, a web server, a file system server, and so on. In addition, the user computers may each be a certain type such as a management computer, a technical support computer, a developer computer, a secretarial computer, and so on. Each server and user computer may have various applications installed that are needed to support the function of the computer. If an unauthorized application is executed, it can potentially expose all the computers on the network of the corporation to malware vulnerabilities.

As used herein, the term "application" refers to any software that can be separately identified and executed such as application programs, applets, dynamic-link libraries, operating system software, scripts, add-in, operating system drivers, and so on. To help support this difficult task, security tools, such as Windows® AppLocker™ published by Microsoft Corporation of Redmond, Wash., may be installed on each computer to help ensure that only certain authorized applications are allowed to execute on each computer. However, an application whitelist may still leave a system vulnerable to malware, as malicious code may even be embedded in applications on the whitelist. Since the application is on the whitelist, the application, along with any embedded malware, may freely execute on the device, leaving a relatively large system security vulnerability.

Embodiments described herein overcome these issues by, instead of permitting applications on a whitelist to execute freely on a device, assigning and enforcing a rule for each whitelisted application that specifies one or more time periods during which the application may execute. The time period(s) during which the application is permitted to execute may be assigned, for example and without limitation, through a user interface or automatically based on a prior execution history of the whitelisted application. By assigning time period(s) during which an application is permitted to execute, a system can block any attempts to execute the application outside of the time period(s), thereby reducing the risk that an unauthorized execution takes place.

This approach has numerous advantages, including but not limited to: reducing the overall attack surface by limiting the time period(s) during which whitelisted applications are permitted to execute. Furthermore, the time period(s) during which applications can execute may be determined by analyzing an execution history of the applications, thereby decreasing the time an administrator needs to expend to set up, implement, and monitor an application whitelist. In addition, the assignment and enforcement of temporal rules can reduce a device's overall vulnerability by ensuring that permitted applications will continue to run when necessary, while blocking any unintended executions outside of the specified time period(s).

Accordingly, embodiments provide the following (and additional) capabilities pertaining to managing the execution of applications on a device: (1) a mechanism to reduce a device's overall attack surface through the use of a temporal application whitelist; (2) a mechanism to automatically generate a temporal application whitelist using an application's execution history; and (3) a mechanism to reduce a device's overall vulnerability, while not hindering its normal operations.

Example embodiments will now be described that are directed to techniques for managing an execution of applications in a computing environment. For instance, FIG. 1 shows a block diagram of an example computing device 100 containing components for managing an execution of applications on computing device 100, according to an example embodiment. As shown in FIG. 1, computing device 100 includes an application manager 102, an operating system 106, and a user interface 108. Each of these components will now be described.

Computing device 100 may represent a processor-based electronic device capable of executing computer programs installed thereon. In one embodiment, computing device 100 comprises a desktop computer, server, or other non-mobile computing platform that is capable of executing computing programs. An example desktop computer that may incorporate the functionality of computing device 100 will be discussed below in reference to FIG. 11. In another embodiment, computing device 100 comprises a mobile device, such as a mobile phone (e.g., a smart phone), a laptop computer, a tablet computer, a netbook, a wearable computer, or any other mobile device capable of executing computing programs. One example of a mobile device that may incorporate the functionality of computing device 100 will be discussed below in reference to FIG. 12.

Although computing device 100 is shown as a standalone computing device, in an embodiment, computing device 100 may be included as a node(s) in one or more other computing devices (not shown), or as a virtual machine. Computing device may also be communicatively coupled to a network (not shown), which may comprise one or more networks such as local area networks (LANs), wide area networks (WANs), enterprise networks, the Internet, etc., and may include one or more of wired and/or wireless portions.

Application manager 102 may, for example, comprise a security tool that operates in conjunction with, or within, operating system 106. Application manager 102 is configured to control the execution of applications on computing device 100. For example, application manager 102 may contain software to block malware from executing on computing device 100. Application manager 102 may also be configured to obtain a list of applications permitted to execute on computing device 100, which may also be referred to as an application whitelist. An application whitelist may be obtained based in whole or in part on a user input through user interface 108 or may be obtained automatically from computing device 100. For example, computing device 100, application manager 102, and/or operating system 106 may automatically generate a list of applications to be placed on an application whitelist.

Application manager 102 also includes a temporal application whitelisting enabler 104. Temporal application whitelisting enabler 104 may assign, for any of the applications on an application whitelist, a temporal rule that specifies one or more time periods during which the application may execute on computing device 100. For instance, if a backup process executes on a device each day at 2:00 a.m. for no greater than 30 minutes, temporal application whitelisting enabler 104 may assign a rule such that application manager 102 permits the execution of the backup process between 2:00 a.m. and 2:30 a.m. daily, and prevents the execution of the backup process during all other times. In this manner, application manager 102 permits the execution of the backup process as scheduled, while preventing the execution of the backup process when unintended.

Temporal rules in temporal application whitelisting enabler 104 may be assigned by a user through a temporal application whitelisting user interface (UI) 110, or may be assigned automatically based on an execution history of the whitelisted applications. In an embodiment, temporal rules in temporal application whitelisting enabler 104 may be assigned by a combination of a user input through temporal application whitelisting UI 110 and an execution history of the whitelisted applications. In an embodiment, temporal application whitelisting enabler 104 may be incorporated as a feature within application manager 102, such that application manager 102 permits execution of one or more whitelisted applications only during one or more respective time period(s) identified in one or more temporal rules. In another embodiment, such as where application manager 102 cannot be configured to implement temporal rules, temporal application whitelisting enabler 104 may be provided as a separate component working in conjunction with application manager 102. For instance, temporal application whitelisting enabler 104 may selectively add an application to an application whitelist in application manager 102 at the beginning of a specified time period, and remove the application from the application whitelist at the end of the time period. In this manner, application manager 102 permits the execution of one or more applications only during a particular time period, while blocking any attempts to execute the application outside of the time period.

Operating system 106 may be configured to control the allocation and usage of the components within, or connected to, computing device 100 and provide support for programs to be executed thereon. Operating system 106 may operate in conjunction with application manager 102 and/or temporal application whitelisting enabler 104 to permit execution of whitelisted applications during one or more specified time periods and prevent the execution of applications during all other times.

User interface 108 may be any one of a graphical user interface, touch screen interface, audio interface, haptic interface, or any other interface by which a user may interact with computing device 100. User interface 108 includes temporal application whitelisting UI 110. Temporal application whitelisting UI 110 may provide an interface that enables a user of computing device 100 to access temporal application whitelisting enabler 104. In an embodiment, temporal application whitelisting UI may enable a user to view, create, delete, disable, and/or modify one or more temporal rules in temporal application whitelisting enabler 104.

Figure 2:
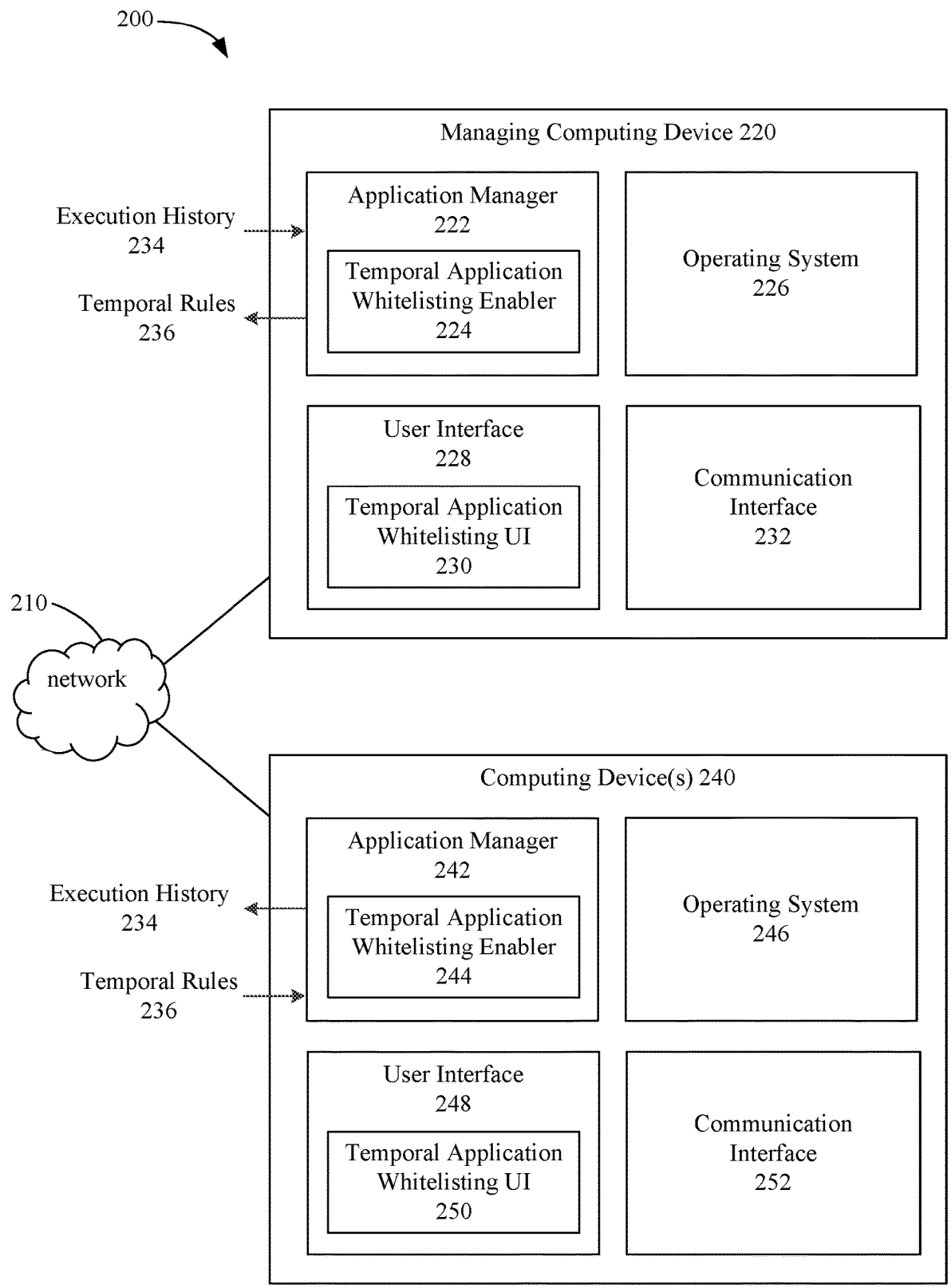
FIG. 2 shows a block diagram of a system for managing an execution of applications on a networked computing device, according to an example embodiment.

Turning now to FIG. 2, another example embodiment is described directed to a technique for managing an execution of applications in a computing environment. In particular, FIG. 2 shows a block diagram of an example system 200 for managing the execution of applications across various computing devices, according to an example embodiment. As shown in FIG. 2, system 200 includes a managing computing device 220 and one or more computing device(s) 240. In an embodiment, computing device(s) 240 are managed by managing computing device 220. Managing computing device 220 and computing device(s) 240 are communicatively coupled via one or more networks 210. Though computing device(s) 240 may be separate devices, in an embodiment, computing device(s) 240 may be included as node(s) or virtual machines in one or more devices. Network 210 may comprise one or more networks such as local area networks (LANs), wide area networks (WANs), enterprise networks, the Internet, etc., and may include one or more of wired and/or wireless portions. Managing computing device 220 and computing device(s) 240 may communicate with each other via network 210 through a communication interface 232 and a communication interface 252, respectively. In an embodiment, managing computing device 220 and computing device(s) 240 may communicate via one or more application programming interfaces (API).

Managing computing device 220 performs management functions for one or more devices connected on network 210. For instance, as shown in FIG. 1, managing computing device 220 includes an application manager 222, an operating system 226, a user interface 228, and a communication interface 232. Application manager 222 may be configured to manage the execution of applications on one or more computing device(s) 240 connected to network 210. For instance, application manager 222 contains a temporal application whitelisting enabler 224. Temporal application whitelisting enabler 224 may contain an application whitelist identifying applications that are permitted to execute on computing device(s) 240. Temporal application whitelisting enabler 224 may also assign, for one or more of the applications on the application whitelist, a rule specifying one or more time periods during which the application is permitted to execute computing device(s) 240. In an embodiment, temporal application whitelisting enabler 224 receives an application execution history 234 from one or more computing device(s) 240. By analyzing a historical execution of applications on computing device(s) 240, temporal application whitelisting enabler 224 may automatically generate temporal rules 236 specifying one or more time periods during which one or more applications are permitted to execute on computing device(s) 240. For example, if temporal application whitelisting enabler 224 determines, based on an analysis of execution history 234, that a certain application executes on computing device(s) 240 for 30 minutes each day at the same time, temporal application whitelisting enabler 224 may automatically create a rule in temporal rules 236 specifying the 30-minute time period for the application. Temporal application whitelisting enabler 224 in managing computing device 220 may transmit temporal rules 236 to one or more computing device(s) 240 through communication interface 232 and/or network 210.

In an embodiment, temporal rules 236 may be assigned by a user or administrator through user interface 228 and/or temporal application whitelisting user interface (UI) 230, or may be assigned automatically based on an analysis of execution history 234, as described above. In another embodiment, temporal rules 236 may be assigned by a combination of a user input through user interface 228 and/or temporal application whitelisting UI 230, and an analysis of execution history 234.

Operating system 226 may be configured to control the allocation and usage of the components within, or connected to, managing computing device 220 and provide support for programs to be executed thereon. Operating system 226 may operate in conjunction with application manager 222 and/or temporal application whitelisting enabler 224 to permit management of the execution of whitelisted applications during one or more specified time periods and prevent the execution of applications during all other times.

User interface 228 may be any one of a graphical user interface, touch screen interface, audio interface, haptic interface, or any other interface by which a user or administrator may interact with managing computing device 220. User interface 228 includes temporal application whitelisting UI 230. Temporal application whitelisting UI 230 may provide an interface that enables a user or administrator of managing computing device 220 to access temporal rules 236. In an embodiment, temporal application whitelisting UI 230 may enable a user to view, create, delete, disable, and/or modify one or more rules in temporal rules 236.

Computing device(s) 240 may comprise, for example, a network-accessible server infrastructure. In an embodiment, computing device(s) 240 may form a network-accessible server set, such as a cloud computing server network. For example, each of computing device(s) 240 may comprise a group or collection of servers (e.g., computing devices) that are each accessible by a network such as the Internet (e.g., in a "cloud-based" embodiment) to store, manage, and process data. Each of computing device(s) 240 may comprise any number of computing devices, and may include any type and number of other resources, including resources that facilitate communications with and between the servers, storage by the servers, etc. (e.g., network switches, storage devices, networks, etc.). Computing device(s) 240 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the computing device(s) 240 may be co-located (e.g., housed in one or more nearby buildings with associated components such as backup power supplies, redundant data communications, environmental controls, etc.) to form a datacenter, or may be arranged in other manners. Accordingly, in an embodiment, computing device(s) 240 may each be a datacenter in a distributed collection of datacenters.

Each of computing device(s) 240 may be configured to execute one or more services (including microservices), applications, and/or supporting services. A "supporting service" is a cloud computing service/application configured to manage a set of servers (e.g., a cluster of servers in servers) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be written in any programming language. Each of computing device(s) 240 may be configured to execute any number of supporting service, including multiple instances of the same supporting service.

In another embodiment, computing device(s) 240 may include the computing devices of users (e.g., individual users, family users, enterprise users, governmental users, etc.) that are managed by an administrator. Computing device(s) 240 may include any number of computing devices, including tens, hundreds, thousands, millions, or even greater numbers of computing devices. Computing devices of computing device(s) 240 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

Each of computing device(s) 240 includes an application manager 242, an operating system 246, a user interface 248, and a communication interface 252. Application manager 242 may, for example, comprise a security tool that operates in conjunction with, or within, operating system 246. Application manager 242 may track an execution history 234 of applications executing on computing device(s) 240. For instance, application manager 242 may determine that a backup process executes on computing device(s) 240 daily between 2:00 a.m. and 2:30 a.m. Application manager 242 may store execution history 234 in a log, or any other suitable storage, on computing device(s) 240. Application manager may also transmit execution history 234 to any other device on network 210, such as managing computing device 220.

Application manager 242 is also configured to control the execution of applications on computing device(s) 240. For example, application manager 242 may contain software to block malware from executing on computing device(s) 240. Application manager 242 may also be configured to obtain an application whitelist identifying applications permitted to execute on computing device(s) 240. Application manager 242 may also obtain temporal rules 236 from managing computing device 220 providing one or more time periods during which one or more whitelisted applications may execute on computing device(s) 240. In an embodiment, temporal rules 236 may also include an application whitelist. In another embodiment, the application whitelist may be based in whole or in part on a user input through user interface 228, user interface 248, or may be obtained from managing computing device 220 or computing device(s) 240.

Application manager 242 also includes a temporal application whitelisting enabler 244. Temporal application whitelisting enabler 244 may assign, for any of the applications on an application whitelist, a rule that specifies one or more time periods during which an application may execute on computing device 240. For example, temporal application whitelisting enabler 244 may assign temporal rules to one or more whitelisted applications using temporal rules 236 received from managing computing device 220, such that applications on the application whitelist execute only during a specified time period or time periods. For instance, if temporal rules 236 specified a time period of 2:00 a.m. to 2:30 a.m. for a backup process to execute daily on computing device(s) 240, application manager 242 and temporal application whitelisting enabler 244 would permit the execution of the backup process during the specified time period, and prevent the execution of the backup process at all other times. In this manner, managing device 220 may permit the backup process to execute on computing device(s) 240 as scheduled, while preventing the execution of the backup process when unintended, without requiring any intervention by a user of computing device(s) 240.

In an embodiment, application manager 242 and/or temporal application whitelisting enabler 244 may be configured to directly incorporate temporal rules 236 received from managing computing device 220. In such an embodiment, application manager 242 and/or temporal application whitelisting enabler 244 contain one or more time periods for each whitelisted application specifying when the application is permitted to execute. In this manner, application manager 242 can permit the execution of one or more whitelisted applications during a given time period or time periods, and prevent the execution outside of the time period(s). In another embodiment, such as where an application manager may not be configured to directly incorporate temporal rules, temporal rules 236 may be provided to temporal application whitelisting enabler 244, which works in conjunction with application manager 242. In this manner, temporal application whitelisting enabler 244 may add an application to an application whitelist in application manager 242 at the beginning of a time period specified in temporal rules 236, and remove the application from the application whitelist at the end of the time period. In this manner, application manager 242 still permits the execution of one or more applications only during a particular time period or time periods provided by temporal rules 236, while blocking any attempts to execute the application outside of the time period(s).

Operating system 246 may be configured to control the allocation and usage of the components within, or connected to, computing device(s) 240 and provide support for programs to be executed thereon. Operating system 246 may operate in conjunction with application manager 242 and/or temporal application whitelisting enabler 244 to permit execution of whitelisted applications during a specified time period and prevent the execution of applications during all other times.

User interface 248 may be any one of a graphical user interface, touch screen interface, audio interface, haptic interface, or any other interface by which a user may interact with computing device(s) 240. User interface 248 includes temporal application whitelisting UI 250. Temporal application whitelisting UI 250 may provide an interface that enables a user of computing device(s) 240 to access temporal application whitelisting enabler 244 and/or temporal rules 236. In an embodiment, temporal application whitelisting UI 250 may enable a user to view, create, delete, disable, and/or modify one or more temporal rules in temporal application whitelisting enabler 244, including one or more rules in temporal rules 236 received from managing computing device 220.

Figure 3:
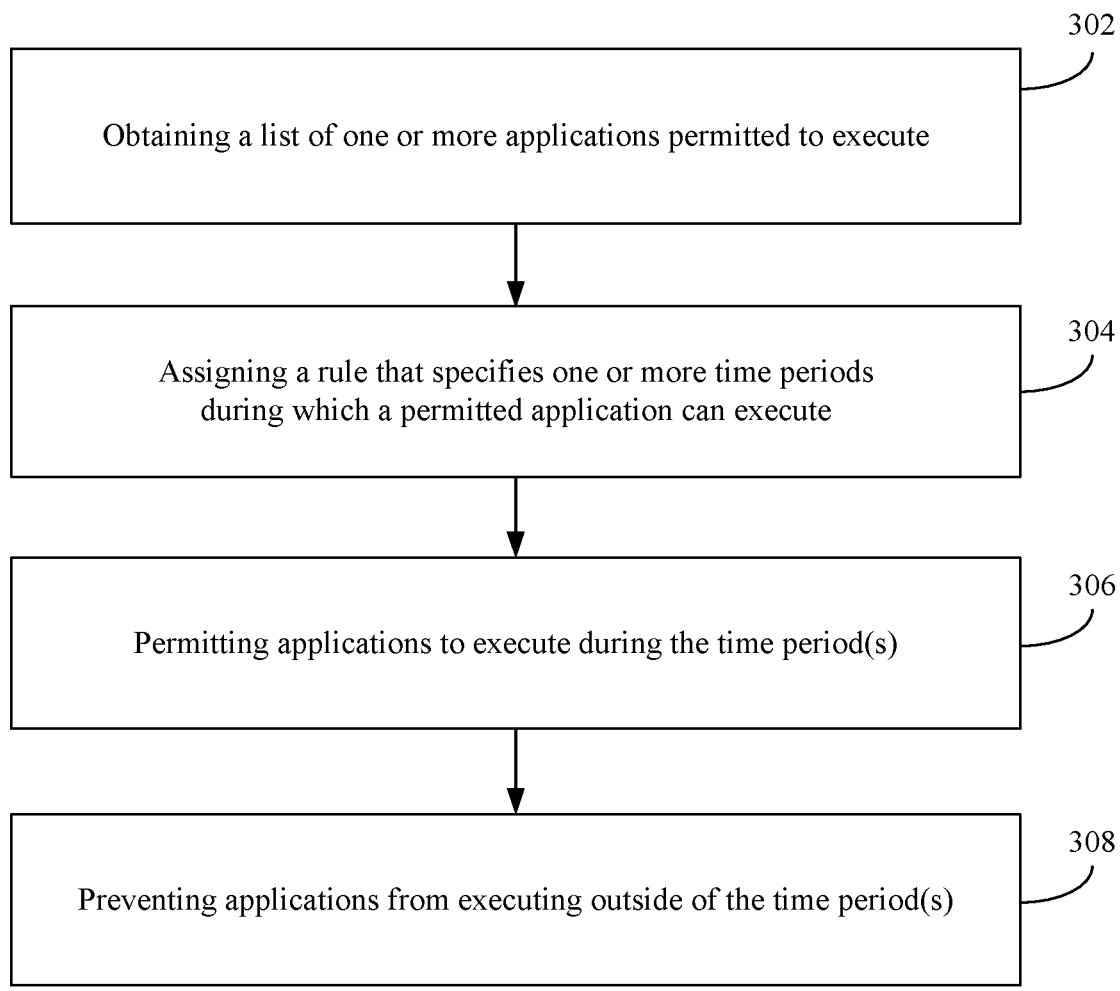
FIG. 3 shows a flowchart of a method for managing an execution of applications on a computing device, according to an example embodiment.

Accordingly, in embodiments, an execution of applications may be managed on a computing device 100 or one or more computing device(s) 240. Temporal application whitelisting enabler 104, temporal application whitelisting enabler 224, and temporal application whitelisting enabler 244 may perform the application execution management in various ways. For instance, FIG. 3 shows a flowchart 300 of a method for managing an execution of applications on a computing device, according to an example embodiment. In an embodiment, flowchart 300 may be implemented by temporal application whitelisting enabler 104, temporal application whitelisting enabler 224, and/or temporal application whitelisting enabler 244. FIG. 3 is described with continued reference to FIGS. 1 and 2. Other structural and operational embodiments will be apparent to persons skilled in the relevant art(s) based on the following discussion regarding flowchart 300, computing device 100 of FIG. 1, and system 200 of FIG. 2.

Flowchart 300 begins with step 302. In step 302, a list of one or more applications that are permitted to execute is obtained. For example, with reference to FIG. 1, application manager 102 obtains an application whitelist that identifies the applications permitted to execute on computing device 100. In an embodiment, the application whitelist may be obtained, in whole or in part, through a user input through user interface 108. For example, a user may specifically identify one or more applications that are permitted to execute on computing device 100 through user interface 108. In another embodiment, application manager 102 obtains a list of permitted applications automatically from computing device 100.

In step 304, a rule is assigned that specifies one or more time periods during which one or more permitted applications may execute in a computing environment. For instance, with reference to FIG. 1, temporal application whitelisting enabler 104 may assign, for one or more applications on an application whitelist, a rule identifying one or more time periods for the one or more applications to execute on computing device 100. In an embodiment, rules may be assigned by a user input through temporal application whitelisting UI 110. In another embodiment, temporal rules may be assigned automatically based on an execution history of the applications on computing device 100. In another embodiment, temporal rules in temporal application whitelisting enabler 104 may be assigned by a combination of a user input and an execution history of an application.

For example, temporal application whitelisting enabler 104 is configured to monitor an execution history for one or more applications on an application whitelist. In another embodiment, temporal application whitelisting enabler 104 obtains an application's execution history through a log stored on computing device 100. For instance, temporal application whitelisting enabler 104 may analyze an application's execution history to determine one or more of the following characteristics for a particular application: a length of time the application executes; the time at which an application started executing; the time at which an application ceased to execute; the frequency at which an application executes; a specific day (or days) of a week, month or year the application executes; and/or any other characteristic relating to an application's execution on computing device 100. Using these metrics, temporal application whitelisting enabler 104 can automatically create a rule permitting a particular application to execute only during a certain time period or time periods.

Temporal rules may be stored in temporal application whitelisting enabler 104 in any manner. For example, a temporal rule may specify a specific day (or days) of a week, month or year for an application to execute. A temporal rule may also identify a length of time, for example, in seconds, minutes, and/or hours, for an application to execute on computing device 100. In an embodiment, a temporal rule may also include a start and/or end time for an application to execute. In another embodiment, a temporal rule may also include a frequency or recurrence of the time period(s) in which an application is permitted to execute.

In step 306, an application is permitted to execute during a time period or time periods specified in a corresponding temporal rule. For example, in FIG. 1, temporal application whitelisting enabler 104 may work with application manager 102 in various ways to permit the execution of applications during a specified time period or time periods. In one embodiment, the application whitelist in application manager 102 further includes a temporal rule assigned by temporal application whitelisting enabler 104. In this manner, because an application whitelist also includes a temporal rule for one or more applications, application manager 102 may be configured to permit execution of whitelisted applications only during a specified time period or time periods.

In another embodiment, an existing whitelisting solution may not be capable of being modified to include temporal rules for one or more whitelisted applications. For example, application manager 102 may be configured to implement permanent rules, i.e., rules that permit an application on an application whitelist to execute at any point in time. In such an embodiment, temporal application whitelisting enabler 104 may be provided as a separate component working in conjunction with application manager 102. For example, temporal application whitelisting enabler 104 may be responsible for monitoring the time at which an application is permitted to execute. At the beginning of a time period specified in a temporal rule, temporal application whitelisting enabler 104 may insert the application to an application whitelist existing application manager 102, such that the existing whitelisting solution may execute the whitelisted application during the specified time period.

In step 308, an application is prevented from executing outside of the specified time period(s). For example, with reference to FIG. 1, in one embodiment, application manager 102 may block an application from executing on computing device 102 if the attempted execution is determined to be outside of the specified time period(s) provided in the temporal rules. Application manager 102 thereby may selectively permit one or more applications to execute only during a specified time period or time periods, which can drastically reduce the overall vulnerability of computing device 100. For example, instead of permitting a certain application to execute on a device at all times, i.e., 24 hours a day, a temporal limitation permitting an application to execute for only 15 minutes each day leaves an attacker only a 1% chance of exploiting a potential vulnerability.

In another embodiment, such as where temporal application whitelisting enabler 104 is provided as a separate component working on conjunction with an existing whitelisting tool, temporal application whitelisting enabler 104 is configured to remove the application from an application whitelist on application manager 102 at the end of a specified time period. In this manner, even if application manager 102 is not configured to handle any temporal rules, temporal application whitelist enabler 104 can selectively add and/or remove applications from an application whitelist at specified times, such that an application is permitted to execute only during an assigned time period or time periods.

Although flowchart 300 has been described in the preceding paragraphs with reference to FIG. 1, flowchart 300 is not limited to an embodiment including computing device 100. Flowchart 300 may be performed in accordance with various other embodiments. For instance, flowchart 300 carried out by the exemplary structure illustrated in FIG. 2 comprising an alternative embodiment in which a managing device manages the execution of applications one or more other devices over a network. Flowchart 300 may also be carried out in accordance with the embodiments illustrated FIGS. 4 and 5, which show block diagrams of a managing computing device 420 and one or more computing device(s) 540.

Figure 4:
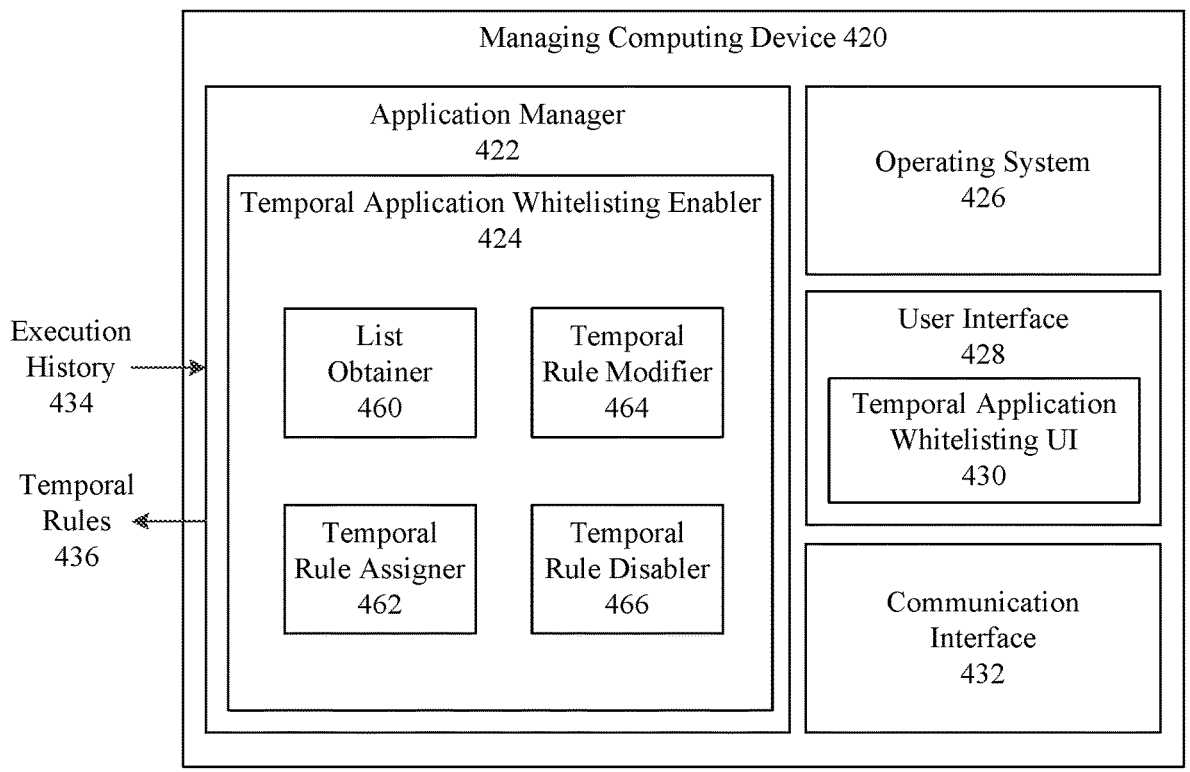
FIG. 4 shows a block diagram of a computing device managing an execution of applications on other computing devices, according to an example embodiment.
Figure 5:
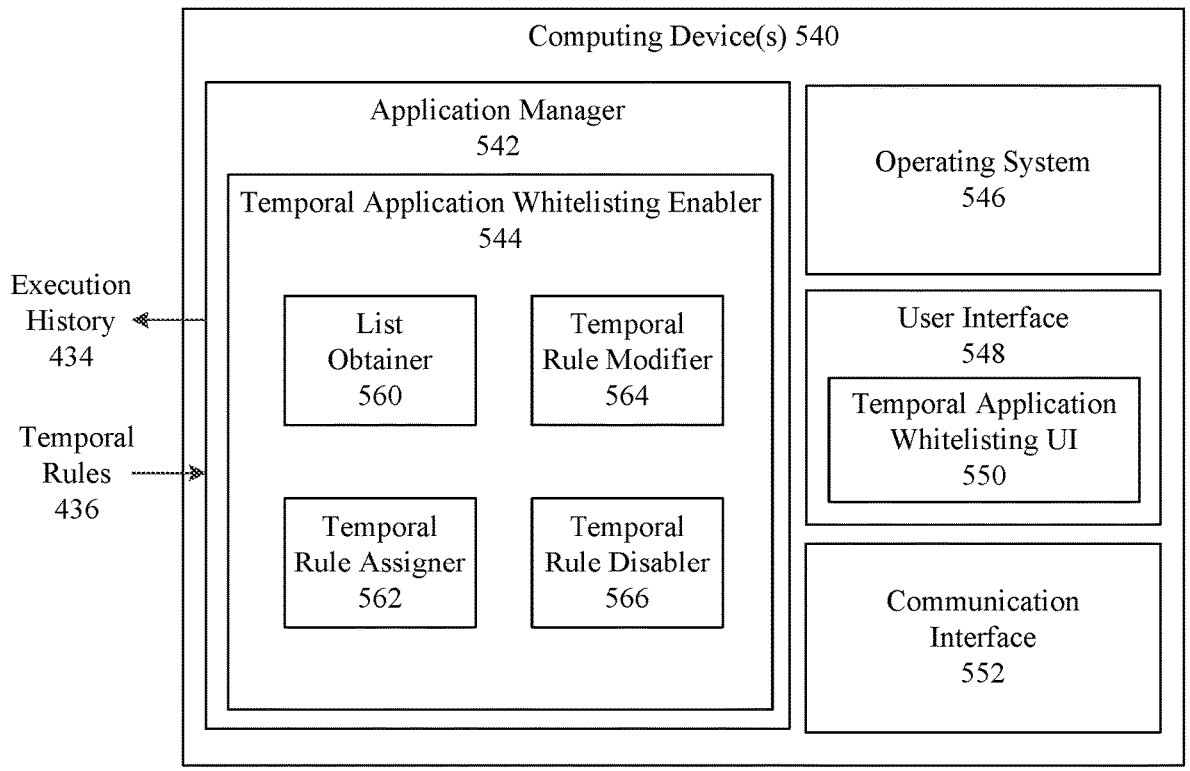
FIG. 5 shows a block diagram of a computing device in which the execution of applications may be controlled by a managing computing device, according to an example embodiment.

Managing computing device 420 of FIG. 4 is one example of managing computing device 220 described above with reference to FIG. 2. For instance, application manager 422, temporal application whitelisting enabler 424, operating system 426, user interface 428, temporal application whitelisting UI 430, and communication interface 432 in FIG. 4 may be substantially similar to application manager 222, temporal application whitelisting enabler 224, operating system 226, user interface 228, temporal application whitelisting UI 230, and communication interface 232, respectively, as described above with reference to FIG. 2. As shown in FIG. 4, temporal application whitelisting enabler 424 also contains a list obtainer 460, a temporal rule assigner 462, a temporal rule modifier 464, and a temporal rule disabler 466. Computing device(s) 540 of FIG. 5 is one example of computing device(s) 240 described above with reference to FIG. 2. For example, application manager 542, temporal application whitelisting enabler 544, operating system 546, user interface 548, temporal application whitelisting UI 550, and communication interface 552 in FIG. 5 may be substantially similar to application manager 242, temporal application whitelisting enabler 244, operating system 246, user interface 248, temporal application whitelisting UI 250, and communication interface 252, respectively, as described above with reference to FIG. 2. As shown in FIG. 5, temporal application whitelisting enabler 544 also contains a list obtainer 560, a temporal rule assigner 562, a temporal rule modifier 564, and a temporal rule disabler 566.

In step 302, for example, with reference to FIGS. 4 and 5, list obtainer 460 and list obtainer 560 may obtain a whitelist of applications in a similar manner as described above, such as via a user input through user interface 428, user interface 548, and/or automatically through computing device 420 and computing device(s) 540. In an embodiment, list obtainer 560 in computing device(s) 540 may obtain a whitelist of applications from temporal application whitelisting enabler 424 in managing computing device 420.

Step 304 of FIG. 3 may also be performed in accordance with the alternative embodiments illustrated in FIGS. 4 and 5 in a similar manner as described above. For instance, temporal rule assigner 462 and temporal rule assigner 562 may assign, for one or more applications on an application whitelist, a rule identifying one or more time periods for the one or more applications to execute on computing device(s) 540. As described above, temporal rules may be assigned by a user through temporal application whitelisting UI 430, temporal application whitelisting UI 550, and/or assigned automatically based on an execution history 434 of the whitelisted applications on computing device 540. In an embodiment, temporal rule assigner 462 may analyze execution history 434 of one or more whitelisted applications running on computing device(s) 540. Using execution history 434, temporal rule assigner 462 in managing computing device 420 may automatically create temporal rules 436 for one or more whitelisted applications. Temporal rules 436 may include one or more of the following rules for an application on a whitelist: a specific day (or days) of a week, month or year for an application to execute; a length of time for an application to execute; a start and/or end time for an application to execute; and/or a frequency or recurrence of the time period(s) in which an application may execute. In such an embodiment, temporal rule assigner 562 in computing device(s) 540 may obtain temporal rules 436 from managing computing device 420 through communication interface 552.

In this manner, managing computing device 420 may manage the execution of applications on another computing device(s) 540. For instance, once temporal rule assigner 562 in computing device(s) 540 obtains temporal rules 436 from managing computing device 420, application manager 542 can permit the execution of applications during the time period(s) set by managing device 420, and prevent the execution of applications outside of the time period. In such an embodiment, a single managing computing device 420 may reduce the vulnerability of tens, hundreds, or even thousands of other computing device(s) 540 in an efficient manner. Moreover, because the security of computing device(s) 540 is being managed by managing computing device 240, users of computing device(s) 540 need not devote the time and/or resources to protect their devices.

As described above, in an embodiment, temporal application whitelisting enabler 104, temporal application whitelisting enabler 224, temporal application whitelisting enabler 244, temporal application whitelisting enabler 424 and temporal application whitelisting enabler 544 may assign a temporal rule for one or more applications on an application whitelist. For instance, FIG. 6 shows a flowchart 600 of a method for assigning a rule according to an example embodiment. In an embodiment, flowchart 600 may be implemented by any of temporal application whitelisting enabler 104, temporal application whitelisting enabler 224, temporal application whitelisting enabler 244, temporal application whitelisting enabler 424 and/or temporal application whitelisting enabler 544, as shown in FIGS. 1, 2, 4, and 5. Other structural and operational embodiments will be apparent to persons skilled in the relevant art(s) based on the following discussion regarding flowchart 600.

Flowchart 600 begins with step 602. In step 602, a rule is assigned, via a user interface, that specifies one or more time periods during which a whitelisted application may execute in a computing environment, according to an example embodiment. For example, with reference to FIG. 1, temporal application whitelisting enabler 104 may assign a temporal rule for one or more applications identifying one or more time periods in which the application is permitted to execute on computing device 100. In an embodiment, a user may assign a temporal rule for one or more applications through temporal application whitelisting UI 110. Temporal application whitelisting UI 110 may include any suitable interface for accessing one or more temporal rules in temporal application whitelisting enabler 104, including but not limited to, a graphical user interface, touch screen interface, audio interface, haptic interface, or any other interface by which a user may interact with computing device 100. In an embodiment, temporal application whitelisting UI 110 may enable a user to view, create, delete, disable, and/or modify one or more temporal rules in temporal application whitelisting enabler 104. For instance, an application may be permitted to execute on a machine for only a limited number of occurrences during a given time period. As an example, a user may wish to authorize one or more applications to execute on computing device 100 during a maintenance or debugging operation of computing device 100. In such a scenario, a user may permit an application to execute only once on computing device 100. In this example, after the time period for executing the application has passed, temporal application whitelisting enabler 104 may automatically delete the rule.

Step 602 may be performed in a similar manner with reference to FIGS. 4 and 5. For instance, temporal application whitelisting enabler 424 and temporal application whitelisting enabler 544, through temporal rule assigner 462 and temporal rule assigner 562, respectively, may assign a temporal rule to one or more whitelisted applications. An administrator of managing computing device 420 may to view, create, delete, disable, and/or modify a temporal rule through temporal application whitelisting UI 430. Similarly, a user of computing device 540 may to view, create, delete, disable, and/or modify a temporal rule through temporal whitelisting UI 550.

In an embodiment, one or more temporal rules in temporal application whitelisting enabler 104, temporal application whitelisting enabler 224, temporal application whitelisting enabler 244, temporal application whitelisting enabler 424 and temporal application whitelisting enabler 544 may be modified. For instance, FIG. 7 shows a flowchart 700 of a method for modifying at least one of a start time, and end time, a run time, and/or a recurrence of a temporal rule, according to an example embodiment. In an embodiment, flowchart 700 may be implemented by any of temporal application whitelisting enabler 104, temporal application whitelisting enabler 224, temporal application whitelisting enabler 244, temporal application whitelisting enabler 424 and/or temporal application whitelisting enabler 544, as shown in FIGS. 1, 2, 4, and 5. Other structural and operational embodiments will be apparent to persons skilled in the relevant art(s) based on the following discussion regarding flowchart 700.

Flowchart 700 begins with step 702. In step 702, a start time, end time, run time, and/or a recurrence of a temporal rule is modified. For instance, with reference to FIG. 1, a temporal rule assigned by temporal application whitelisting enabler 104 may contain a temporal rule identifying a start time and/or an end time for an application to execute on computing device 100. In another embodiment, a temporal rule may identify a run time, for example, in seconds, minutes, and/or hours, for an application to execute on computing device 100. In another embodiment, a temporal rule may include a frequency or recurrence of the time period(s) in which an application may execute on computing device 100. A start time, end time, run time, and/or recurrence of such a temporal rule may be modified, for example, through temporal application whitelisting UI 110 through any suitable user input, as described above.

In another embodiment, a temporal rule for one or more applications may be modified automatically by temporal application whitelisting enabler 104. For instance, temporal application whitelisting enabler 104 may obtain an updated execution history for applications executing on computing device 100. Upon analyzing the updated execution history, temporal application whitelisting enabler 104 may automatically modify a start time, end time, run time, and/or recurrence of one or more temporal rules.

Step 702 may be performed in a similar manner with reference to embodiments illustrated in FIGS. 2, 4, and 5. For instance, temporal rule modifier 464 and/or temporal rule modifier 564 may adjust one or more temporal rules in a similar manner as described above. In an example, a user or administrator of managing device 420 or a user of computing device(s) 540 may access one or more temporal rules through temporal application whitelisting UI 430 or temporal application whitelisting UI 550, which may communicate with temporal rule modifier 464 and temporal rule modifier 564, respectively, to modify a rule. In another embodiment, temporal rule modifier 464 and/or temporal rule modifier 564 may automatically adjust one or more temporal rules based on an updated execution history of applications executing on computing device(s) 540.

As described above, in one embodiment, one or more temporal rules in temporal application whitelisting enabler 104, temporal application whitelisting enabler 224, temporal application whitelisting enabler 244, temporal application whitelisting enabler 424 and temporal application whitelisting enabler 544 may be assigned automatically. For instance, FIG. 8 shows a flowchart 800 of a method for automatically determining a rule for one or more whitelisted applications using the application's execution history. In an embodiment, flowchart 800 may be implemented by any of temporal application whitelisting enabler 104, temporal application whitelisting enabler 224, temporal application whitelisting enabler 244, temporal application whitelisting enabler 424 and/or temporal application whitelisting enabler 544, as shown in FIGS. 1, 2, 4, and 5. Other structural and operational embodiments will be apparent to persons skilled in the relevant art(s) based on the following discussion regarding flowchart 800.

Flowchart 800 begins with step 802. In step 802, an application's execution history is obtained. For example, with reference to FIG. 1, temporal application whitelisting enabler 104 may obtain an execution history by monitoring the application's prior executions on computing device 100. In another embodiment, temporal application whitelisting enabler 104 obtains an application's execution history through a log stored on computing device 100. In step 802, temporal application whitelisting enabler 104 may analyze an application's execution history on computing device 100 to determine one or more of the following characteristics for a particular application: a length of time the application executes; the time at which an application started executing; the time at which an application stopped executing; the frequency or recurrence at which an application executes; a specific day (or days) of a week, month or year the application executes; and/or any other characteristic relating to an application's execution on computing device 100.

In step 804, a rule is automatically determined that specifies one or more time periods in which the permitted application may execute. For instance, with continued reference to FIG. 1, temporal application whitelisting enabler 104 may analyze an execution history for one or more applications to automatically determine a temporal rule permitting execution of the application for a specific time period or time periods. In one instance, the temporal rule may take into account a pattern of prior executions of the one or more applications on computing device 100. For example, if temporal application whitelisting enabler 104 determines that a backup process executes each day at 2:00 a.m. for 30 minutes, temporal application whitelisting enabler 104 may automatically create a rule permitting the backup process to execute between 2:00 a.m. and 3:00 a.m. daily.

In step 806, an automatically determined temporal rule, such as one created through an analysis of an application's execution history, is adjusted. For example, in FIG. 1, a user of computing device 100 may adjust one or more automatically determined temporal rules through temporal application whitelisting UI 110. For instance, a start time, end time, run time, and/or recurrence of such a temporal rule may be adjusted, for example, through temporal application whitelisting UI 110 through any suitable user input, as described above.

In an alternative embodiment, such as embodiments described in FIGS. 2, 4, and 5 where a managing device manages the execution of applications on one or more other computing devices, the steps of flowchart 800 may be performed in a similar manner. For instance, in accordance with step 802, managing device 420 may obtain execution history 434 from one or more computing device(s) 540. In step 804, temporal rule assigner 462 of managing device 420 may automatically determine temporal rules 436 using execution history 434 in a manner as described above. Once temporal rules 436 are automatically determined, temporal rule modifier 464 may optionally adjust one or more temporal rules. For instance, an administrator of managing device 420 may access one or more temporal rules through temporal application whitelisting UI 430, which may communicate with temporal rule modifier 464 to adjust a rule. In another embodiment, a user of computing device(s) 540 may adjust temporal rules 436 through temporal application whitelisting UI 550, which may similarly communicate with temporal rule modifier 564 to adjust one or more temporal rules.

Figure 9:
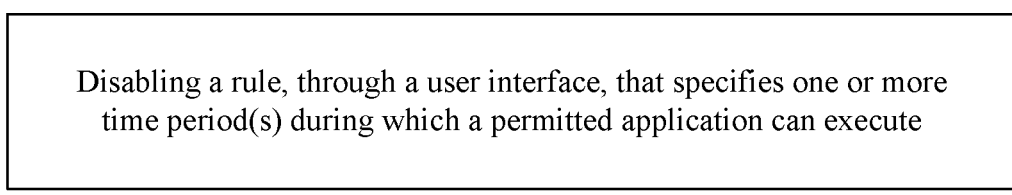
FIG. 9 shows a flowchart of a method for disabling a rule that specifies one or more time periods during which an application may execute via a user interface, according to an example embodiment.

In an embodiment, one or more temporal rules in temporal application whitelisting enabler 104, temporal application whitelisting enabler 224, temporal application whitelisting enabler 244, temporal application whitelisting enabler 424 and temporal application whitelisting enabler 544 may be disabled. For instance, FIG. 9 shows a flowchart 900 for disabling a temporal rule, according to an example embodiment. In an embodiment, flowchart 900 may be implemented by any of temporal application whitelisting enabler 104, temporal application whitelisting enabler 224, temporal application whitelisting enabler 244, temporal application whitelisting enabler 424 and/or temporal application whitelisting enabler 544, as shown in FIGS. 1, 2, 4, and 5. Other structural and operational embodiments will be apparent to persons skilled in the relevant art(s) based on the following discussion regarding flowchart 900.

Flowchart 900 begins with step 902. In step 902, a temporal rule that specifies one or more time periods during which an application may execute is disabled through a user interface. For instance, with reference to FIG. 1, a user may interact with temporal application whitelisting UI 110 to disable a temporal rule assigned by temporal application whitelisting enabler 104. A user may disable a temporal rule assigned previously by a user or automatically by temporal application whitelisting enabler 104. In an embodiment, temporal application whitelisting UI 110 may permit disabling a temporal rule temporarily, such that the rule automatically resumes following the passage of a specified time interval. In another embodiment, disabling a temporal rule permits an application to execute on computing device 100 at all times, i.e., 24 hours a day, until the rule is re-enabled. In yet another embodiment, disabling a temporal rule prevents the application from executing on computing device 100 until the rule is re-enabled.

In an alternative embodiment involving a managing computing device, an administrator of managing computing device 420 may disable a temporal rule implemented on one or more computing device(s) 540. For example, an administrator may interact with temporal application whitelisting UI 430 to remotely disable a temporal rule. In such an embodiment, temporal rule disabler 466 disables the rule and a new or updated set of temporal rules 436 may be transmitted to computing device(s) 540. In an embodiment, temporal rule disabler 566 in computing device(s) 540 may also receive a command to disable a rule in temporal rules 436. In another embodiment, a user of computing device(s) 540 may access temporal rule disabler 566 through temporal application whitelisting UI 550 to disable a temporal rule. In this manner, a rule may be disabled without waiting for an administrator of managing computing device 420.

Figure 10:
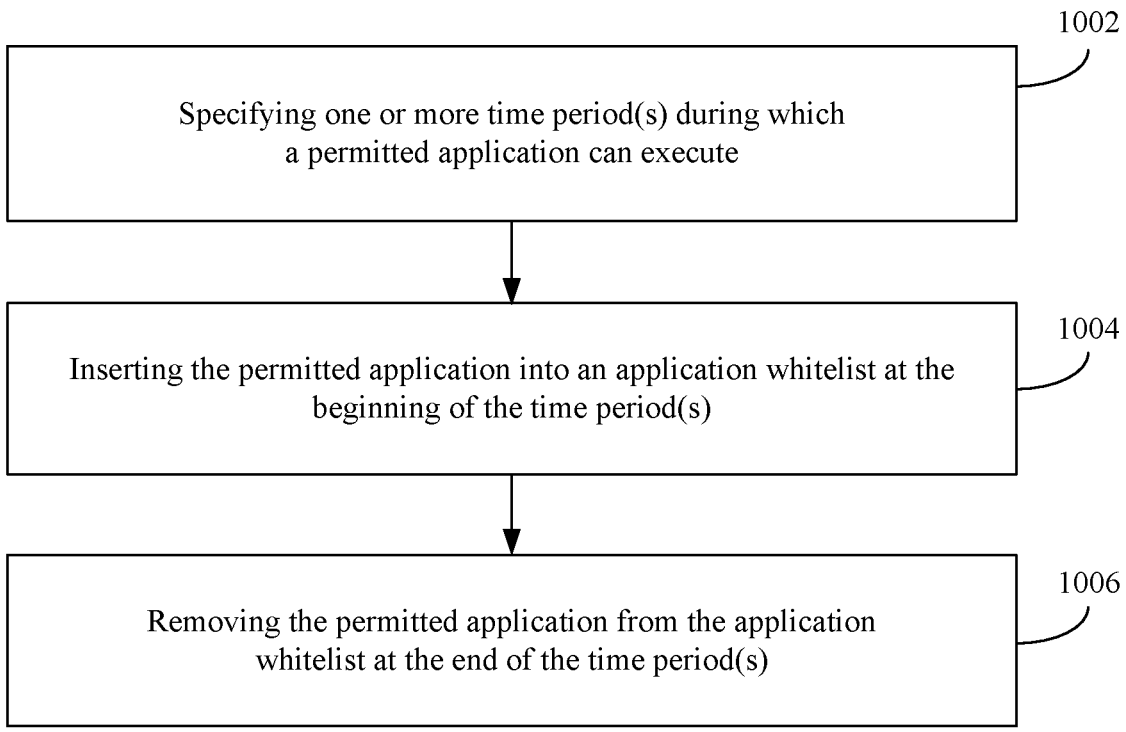
FIG. 10 shows a flowchart of a method for managing an execution of applications on a computing device by inserting and removing applications from a whitelist during specified times, according to an example embodiment.

In an embodiment, an existing whitelisting solution may not be capable of being modified to accept temporal rules for one or more whitelisted applications. In such an embodiment, temporal application whitelisting enabler 104, temporal application whitelisting enabler 224, temporal application whitelisting enabler 244, temporal application whitelisting enabler 424 and temporal application whitelisting enabler 544 may nevertheless operate in with an existing whitelisting solution to limit the execution of applications during a specified time period. For instance, FIG. 10 shows a flowchart 1000 for selectively inserting and removing an application during a specified time period such that the application may execute only during the time period. In an embodiment, flowchart 1000 may be implemented by any of temporal application whitelisting enabler 104, temporal application whitelisting enabler 224, temporal application whitelisting enabler 244, temporal application whitelisting enabler 424 and/or temporal application whitelisting enabler 544, as shown in FIGS. 1, 2, 4, and 5. Other structural and operational embodiments will be apparent to persons skilled in the relevant art(s) based on the following discussion regarding flowchart 1000.

Flowchart 1000 begins with step 1002. In step 1002, one or more time periods during which an application may execute is specified. For instance, with reference to FIG. 1, temporal application whitelisting enabler 104 may specify, based on a temporal rule, that one or more applications may execute on computing device 100 only during a certain time period. For example, temporal application whitelisting enabler 104 may specify a permitted start time, end time, run time, and/or a frequency or recurrence for one or more applications. The permitted start time, end time, run time, and/or a frequency or recurrence for one or more applications may be obtained in any manner as described above, such as through a user input through temporal application whitelisting UI 110 or through an automatic temporal rule created through an analysis of an execution history on computing device 100.

In step 1004, the permitted application is inserted into an application whitelist at the beginning of the specified time period. For example, in FIG. 1, application manager 102 may be an existing whitelisting solution that is only capable of implementing permanent whitelist rules, i.e., rules allowing an application to execute 24 hours a day. In this embodiment, temporal application whitelisting enabler 104 may insert an application into the application whitelist at the beginning of a specified time period. In step 1006, at the conclusion of the time period, temporal application whitelisting enabler 104 removes the application from the application whitelist. In this manner, even though application manager 102 may be not be capable of implementing temporal whitelist rules, temporal application whitelisting enabler 104, implemented as a separate component working in conjunction with application manager 102, selectively inserts permitted applications and removes such applications based on temporal rules. In this way, applications are nevertheless limited from executing on computing device 100 outside of a specified time period and the vulnerability of computing device 100 may be drastically reduced.

In an embodiment similar to the one described in FIG. 2, 4, or 5 utilizing a managing computing device, the flowchart of FIG. 10 may be similarly carried out. For instance, in step 1002, managing computing device 420 may specify one or more time periods during which an application may execute. In steps 1004 and 1006, managing computing device may transmit temporal rules 436 to one or more computing device(s) 540 that selectively inserts and removes applications from an application whitelist on computing device(s) 540. In one example, temporal application whitelisting enabler 544 in computing device(s) 540 may specify a time period or time periods in which one or more applications may execute on computing device(s) 540 based on temporal rules 436. Temporal application whitelisting enabler 544 may selectively insert and remove applications onto an application whitelist in a similar manner as described above to temporally limit the execution of applications.

In another example, managing computing device 420 may selectively add and remove applications to an application whitelist on computing device(s) 540 through one or more commands transmitted in temporal rules 436. For instance, temporal application whitelisting enabler 424 in managing computing device 420 may further transmit commands within temporal rules 436 instructing temporal application whitelisting enabler 544 to add and/or remove applications to a whitelist. For instance, managing computing device 420 may transmit a command at 2:00 a.m., through temporal rules 436, to one or more computing device(s) 540 to insert a backup process to an application whitelist on computing device(s) 540. Upon receiving the command at 2:00 a.m., temporal application whitelisting enabler 544 in computing device(s) 540 adds the backup process to the whitelist, thereby permitting it to execute on computing device(s) 540. In this example, managing computing device 420 may send another command at 2:30 a.m., through temporal rules 436, to one or more computing device(s) 540 to remove the backup process from the whitelist. At this time, temporal application whitelisting enabler 544 in computing device(s) 540 removes the backup process from the whitelist, thereby preventing the backup process from executing on computing device(s) 540 after 2:30 a.m. In this manner, temporal limits may be placed on whitelisted applications regardless of whether an existing whitelist solution is configured to implement such limits.

III. Example Computer System Implementation

One or more of the components of computing device 100, managing computing device 220, computing device(s) 240, managing computing device 420, and computing device(s) 540, and one or more steps of flowchart 300, flowchart 600, flowchart 700, flowchart 800, flowchart 900, and flowchart 1000 may be implemented in hardware, or hardware combined with software and/or firmware. For example, one or more of the components of computing device 100, managing computing device 220, computing device(s) 240, managing computing device 420, and computing device(s) 540, and one or more steps of flowchart 300, flowchart 600, flowchart 700, flowchart 800, flowchart 900, and flowchart 1000 may be implemented as computer program code/instructions configured to be executed in one or more processors and stored in a computer readable storage medium.

In another embodiment, one or more of the components of computing device 100, managing computing device 220, computing device(s) 240, managing computing device 420, or computing device(s) 540, or one or more steps of flowchart 300, flowchart 600, flowchart 700, flowchart 800, flowchart 900, or flowchart 1000 may also be implemented in hardware that operates software as a service (SaaS) or platform as a service (PaaS). Alternatively, one or more of the components of computing device 100, managing computing device 220, computing device(s) 240, managing computing device 420, and computing device(s) 540, and one or more steps of flowchart 300, flowchart 600, flowchart 700, flowchart 800, flowchart 900, and flowchart 1000 may be implemented as hardware logic/electrical circuitry.

For instance, in an embodiment, one or more of the components of computing device 100, managing computing device 220, computing device(s) 240, managing computing device 420, or computing device(s) 540, or one or more steps of flowchart 300, flowchart 600, flowchart 700, flowchart 800, flowchart 900, or flowchart 1000 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 11:
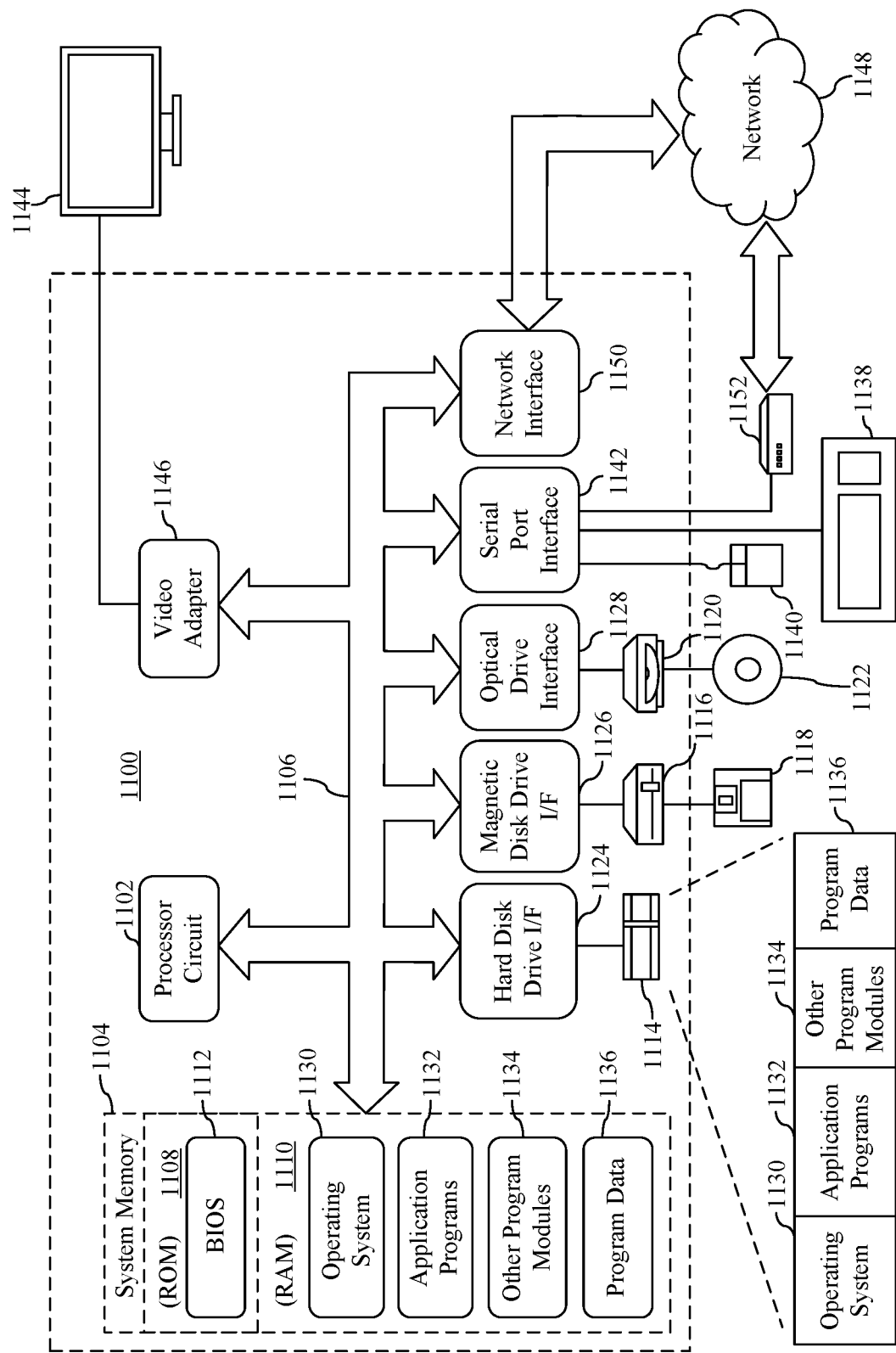
FIG. 11 is a block diagram of an example processor-based computer system that may be used to implement various embodiments.

FIG. 11 depicts an exemplary implementation of a computing device 1100 in which embodiments may be implemented. For example, computing device 100, managing computing device 220, computing device(s) 240, managing computing device 420, and/or computing device(s) 540 may each be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing one or more of the components of computing device 100, managing computing device 220, computing device(s) 240, managing computing device 420, or computing device(s) 540, or one or more steps of flowchart 300, flowchart 600, flowchart 700, flowchart 800, flowchart 900, or flowchart 1000, and/or further embodiments described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Mobile Device Implementation

Figure 12:
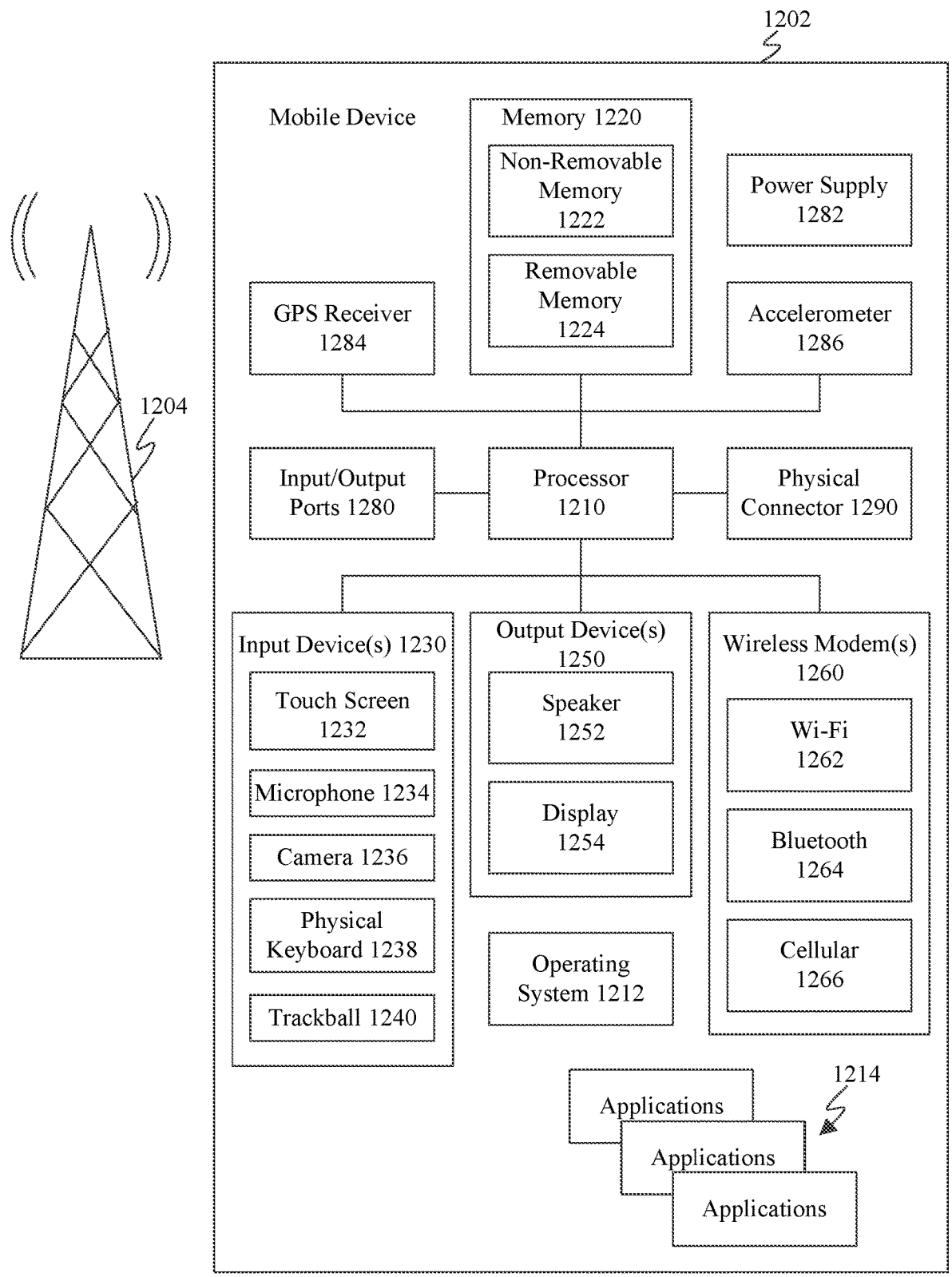
FIG. 12 is a block diagram of an example mobile device that may be used to implement various embodiments.

FIG. 12 is a block diagram of an exemplary mobile device 1202 that may implement embodiments described herein. For example, mobile device 1202 may be used to implement any of computing device 100 described above in reference to FIG. 1, managing computing device 220 or computing device(s) 240 as described above in reference to FIG. 2, managing computing device 420 as described above in reference to FIG. 4, or computing device(s) 540 as above described in reference to FIG. 5. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smartphone, handheld computer, Personal Digital Assistant (PDA), etc.) and can allow wireless two-way communications with one or more mobile communications networks 1204, such as a cellular or satellite network, or with a local area or wide area network.

The illustrated mobile device 1202 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and provide support for one or more application programs 1214 (also referred to as "applications" or "apps"). Application programs 1214 may include common mobile computing applications (e.g., digital personal assistants, e-mail applications, calendars, contact managers, web browsers, messaging applications) and any other computing applications (e.g., word processing applications, mapping applications, media player applications).

The illustrated mobile device 1202 can include memory 1220. Memory 1220 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and applications 1214. Example data can include web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device. The input devices 1230 can include a Natural User Interface (NUI).

Wireless modem(s) 1260 can be coupled to antenna(s) (not shown) and can support two-way communications between the processor 1210 and external devices, as is well understood in the art. The modem(s) 1260 are shown generically and can include a cellular modem 1266 for communicating with the mobile communication network 1204 and/or other radio-based modems (e.g., Bluetooth 1264 and/or Wi-Fi 1262). At least one of the wireless modem(s) 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components of mobile device 1202 are not required or all-inclusive, as any components can be deleted and other components can be added as would be recognized by one skilled in the art.

In an embodiment, mobile device 1202 is configured to perform any of the functions of any of computing device 100 described above in reference to FIG. 1, managing computing device 220 or computing device(s) 240 as described above in reference to FIG. 2, managing computing device 420 as described above in reference to FIG. 4, or computing device(s) 540 as above described in reference to FIG. 5. Computer program logic for performing the functions of these devices may be stored in memory 1220 and executed by processor 1210. By executing such computer program logic, processor 1210 may be caused to implement any of the features of any of these devices. Also, by executing such computer program logic, processor 1210 may be caused to perform any or all of the steps of flowcharts 300, 600, 700, 800, 900, and 1000.

V. Additional Example Embodiments

A method of managing an execution of applications in a computing environment is described herein. The method includes: obtaining a list of one or more applications that are permitted to execute in the computing environment; assigning, to at least one application in the list, a rule that specifies a time period during which the application is allowed to execute in the computing environment; permitting the at least one application to execute in the computing environment during the specified time period; and preventing the at least application from executing in the computing environment outside of the specified time period.

In one embodiment of the foregoing method, the rule is assigned to the at least one application by a user.

In another embodiment of the foregoing method, the method further comprises: modifying the rule, wherein the modifying includes at least one of altering a start time, an end time, a run time, and a recurrence for the at least one application.

In another embodiment of the foregoing method, the rule is automatically determined based at least on an execution history of the at least one application.

In another embodiment of the foregoing method, the method further comprises: adjusting the automatically-determined rule, wherein the adjusting is performed by a user.

In another embodiment of the foregoing method, the rule permits only a limited number of executions of the at least one application in the computing environment.

In another embodiment of the foregoing method, the method further comprises: disabling an implementation of the rule, wherein the disabling is performed by a user.

A system is described herein. The system includes: at least one processor circuit; at least one memory that stores program code configured to be executed by the at least one processor circuit, the program code comprising: a list obtainer configured to obtain a list of one or more applications that are permitted to execute on a managed device; a rule assigner configured to assign, to at least one application in the list, a rule that specifies a time period during which the application is allowed to execute on the managed device, the rule when applied by the managed device permitting the at least one application to execute on the managed device during the specified time period and preventing the at least one application from executing on the managed device outside of the specified time period; and an interface configured to apply the rule to the managed device.

In one embodiment of the foregoing system, rule is assigned to the at least one application by a user.

In another embodiment of the foregoing system, the program code further comprises: a rule modifier configured to modify the rule by altering at least one of a start time, an end time, a run time, and a recurrence for the at least one application.

In another embodiment of the foregoing system, the rule is automatically determined based at least on an execution history of the at least one application.

In another embodiment of the foregoing system, the program code further comprises: a rule modifier that is configured to adjust the automatically-determined rule based on a user input.

In another embodiment of the foregoing system, the rule when applied by the managed device permits only a limited number of executions of the at least one application on the managed device.

In another embodiment of the foregoing system, the program code further comprises: a rule disabler that is configured to disable an implementation of a rule based on user input.

A computer-readable storage medium having program instructions recorded thereon that, when executed by at least one processing circuit, perform a method for managing an execution of applications on a computing device is described herein. The method includes: specifying a time period in which at least one application is permitted to execute on the computing device; and preventing the at least one application from executing on the computing device outside of the specified time period by: inserting the at least one application into a whitelist of applications permitted to execute on the computing device at a beginning of the specified time period; and removing the at least one application from the whitelist of applications permitted to execute on the computing device at an end of the specified time period.

In one embodiment of the foregoing computer-readable storage medium, the specifying is performed by a user.

In another embodiment of the foregoing computer-readable storage medium, the computer-readable storage medium further comprises: modifying the specified time period for the at least one application, wherein the modifying includes at least one of altering a start time, an end time, a run time, and a recurrence for the at least one application.

In another embodiment of the foregoing computer-readable storage medium, the specified time period for the at least one application is automatically determined based at least on an execution history of the at least one application.

In another embodiment of the foregoing computer-readable storage medium, the computer-readable storage medium further comprises: adjusting the automatically-determined specified time period, wherein the adjusting is performed by a user.

In another embodiment of the foregoing computer-readable storage medium, the computing device is a managed computing device.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of managing execution of applications in a computing environment, comprising:
   obtaining a list of one or more applications that are permitted to execute in the computing environment;
   receiving, from each of a plurality of devices in the computing environment, an execution history of at least one application in the list with respect to the device;
   determining a common time at which the at least one application in the list executes on the plurality of devices based on historical execution times identified in the execution histories;
   assigning, to the at least one application in the list, a rule that specifies a time period during which the application is allowed to execute, the specified time period being automatically determined based at least on the common time at which the at least one application in the list executes on the plurality of devices;
   permitting the at least one application to execute in the computing environment during the specified time period; and
   preventing the at least application from executing in the computing environment outside of the specified time period.

2. The method of claim 1, wherein the rule is assigned to the at least one application, at least in part, by a user.

3. The method of claim 1, further comprising:
   modifying the rule, wherein the modifying includes at least one of altering a start time, an end time, a run time, and a recurrence for the at least one application.

4. The method of claim 1, further comprising:
   adjusting the rule, wherein the adjusting is performed by a user.

5. The method of claim 1, wherein the rule permits only a limited number of executions of the at least one application in the computing environment.

6. The method of claim 1, further comprising:
   disabling an implementation of the rule, wherein the disabling is performed by a user.

7. The method of claim 1, wherein the execution history comprises a log that includes one or more of:
   a length of time that the at least one application was executed in the past;
   a time at which the at least one application started executing in the past;
   a time at which the at least one application ceased to execute in the past;
   the frequency at which the at least one application was executed in the past;
   a specific day, month, or year that the at least one application was executed in the past.

8. A system, comprising:
   at least one processor circuit;
   at least one memory that stores program code configured to be executed by the at least one processor circuit, the program code comprising:
      a list obtainer configured to obtain a list of one or more applications that are permitted to execute on a managed device;
      an application manager configured to:
         receive, from each of a plurality of devices in the computing environment, an execution history of at least one application in the list with respect to the device, and
         determine a common time at which the at least one application in the list executes on the plurality of devices based on historical execution times identified in the execution histories;
      a rule assigner configured to assign, to the at least one application in the list, a rule that specifies a time period during which the application is allowed to execute on the managed device, the specified time period being automatically determined based at least on the common time at which the at least one application in the list executes on the plurality of devices, the rule when applied to the managed device permitting the at least one application to execute on the managed device during the specified time period and preventing the at least one application from executing on the managed device outside of the specified time period; and
      an interface configured to apply the rule to the managed device.

9. The system of claim 8, wherein the rule is assigned to the at least one application, at least in part, by a user.

10. The system of claim 8, wherein the program code further comprises:
    a rule modifier configured to modify the rule by altering at least one of a start time, an end time, a run time, and a recurrence for the at least one application.

11. The system of claim 8, wherein the program code further comprises:
    a rule modifier that is configured to adjust the rule based on a user input.

12. The system of claim 8, wherein the rule when applied to the managed device permits only a limited number of executions of the at least one application on the managed device.

13. The system of claim 8, wherein the program code further comprises:
    a rule disabler that is configured to disable an implementation of the rule based on user input.

14. The system of claim 8, wherein the execution history comprises a log that includes one or more of:
- a length of time that the at least one application was executed in the past;
- a time at which the at least one application started executing in the past;
- a time at which the at least one application ceased to execute in the past;
- the frequency at which the at least one application was executed in the past;
- a specific day, month, or year that the at least one application was executed in the past.

15. A computer-readable storage medium having program instructions recorded thereon that, when executed by at least one processing circuit, perform a method for managing execution of applications on a computing device, the method comprising:
- specifying a time period in which at least one application is permitted to execute on the computing device; and
- preventing the at least one application from executing on the computing device outside of the specified time period by:
  - inserting, by a software component, at a beginning of the specified time period, the at least one application into a whitelist of applications utilized by a security tool to selectively permit the at least one application to execute on the computing device, the security tool not being capable of implementing a temporal whitelist rule; and
  - removing, by the software component, at the end of the specified time period, the at least one application from the whitelist of applications to prevent the at least one application from executing on the computing device.

16. The computer-readable storage medium of claim 15, wherein the specifying is performed, at least in part, by a user.

17. The computer-readable storage medium of claim 15, further comprising:
- modifying the specified time period for the at least one application, wherein the modifying includes at least one of altering a start time, an end time, a run time, and a recurrence for the at least one application.

18. The computer-readable storage medium of claim 15, further comprising:
- adjusting the specified time period, wherein the adjusting is performed by a user.

19. The computer-readable storage medium of claim 15, wherein the computing device is a managed computing device.

20. The computer-readable storage medium of claim 15, wherein the specifying the time period in which at the least one application is permitted to execute on the computing device is based at least in part on an execution history of the at least one application, the execution history comprising a log that includes one or more of:
- a length of time that the at least one application was executed in the past;
- a time at which the at least one application started executing in the past;
- a time at which the at least one application ceased to execute in the past;
- the frequency at which the at least one application was executed in the past;
- a specific day, month, or year that the at least one application was executed in the past.

* * * * *